United States Patent

Macfarlane et al.

[15] 3,661,194
[45] May 9, 1972

[54] PREVAILING TORQUE FASTENER

[72] Inventors: Donald B. Macfarlane, Troy; Gary T. Rathka, Sterling Heights, both of Mich.

[73] Assignee: Standard Pressed Steel Co., Jenkintown, Pa.

[22] Filed: Jan. 2, 1970

[21] Appl. No.: 257

[52] U.S. Cl. .................................................. 151/22
[51] Int. Cl. .................................................. F16b 39/30
[58] Field of Search .............. 151/22, 21 B, 2 A; 85/46; 10/10, 27 R

[56] References Cited

UNITED STATES PATENTS

| | | | |
|---|---|---|---|
| 756,269 | 4/1904 | McMahon | 151/22 |
| 1,070,247 | 8/1913 | Haines | 151/22 |
| 3,238,985 | 3/1966 | Reid et al | 151/22 |
| 3,459,250 | 8/1969 | Tabor | 151/22 |
| 3,460,598 | 8/1969 | Thurston | 151/22 |
| 3,481,380 | 12/1969 | Breed | 151/22 |

*Primary Examiner*—Marion Parsons, Jr.
*Attorney*—Andrew L. Ney

[57] ABSTRACT

A prevailing torque fastener including a threaded section having a plurality of thread convolutions and a leading end that makes initial engagement with a mating thread when the fastener is tightened on a mating member. Some of the thread convolutions have a projection formed thereon extending axially of the fastener toward the leading end of the threaded section. The projections progressively increase in size from the leading end of the fastener so that the projections nearer the leading end are smaller than the adjacent projections nearer the other end of the fastener.

11 Claims, 5 Drawing Figures

INVENTORS
Donald B. Macfarlane &
Gary T. Rathka
BY
ATTORNEY

INVENTORS
Donald B. Macfarlane &
Gary T. Rathka
BY
ATTORNEY

PREVAILING TORQUE FASTENER

This invention relates to prevailing torque fasteners of the type that generally include a threaded section having axially extending projections spaced along a flank of the thread, which projections engage the thread of a mating member with an interference fit. Thus, a friction force is established at the engagement of the projections and the mating thread that adds to the torque required to rotate the fastener on the mating member. When the fastener is fully tightened in the mating member, the load established by the interference fit resists loosening of the fastener that might otherwise occur due to vibrations and other accidental torque.

When a conventional fastener of this type is torqued onto the mating piece, the projections engage the mating thread in succession according to their location with respect to the end of the fastener that makes initial contact with the mating piece, i.e., the leading end. Accordingly, the projection closest to the leading end of the fastener makes contact with the mating thread before the next adjacent projection and causes a deflection of the thread on the mating piece. After the projection is rotated from a particular position, the thread on the mating piece springs back toward, but never quite returns to its original position so that as the next projection engages the mating thread, depending on the spring back, it may only follow the path of the preceding projection and will not develop the desired interference fit and, therefore, friction force. In certain cases, the projection closest to the leading edge of the fastener may be the only one resisting rotation of the fastener and, in any event, the desired friction force may never be established.

Various other problems are common to fasteners of this type, e.g., since the load is established immediately upon engagement of the projections with the mating thread, the torque required to tighten the fastener, or on-torque, is increased. Because of the increased on-torque requirement, special wrenching tools may be required and add to the cost of using these fasteners. Another problem common to these fasteners arises from the fact that the projections are generally V-shaped and make point contact with the mating thread which can lead to excessive wear on the mating thread. Accordingly, the desired interference fit and friction force may never be established.

It is an object of this invention, therefore, to provide a prevailing torque fastener that provides the desired resistance to loosening.

It is another object of this invention, therefore, to provide a prevailing torque fastener that does not require an excessive on-torque.

It is yet another object of this invention to provide a prevailing torque fastener that does not provide excessive wear on the mating thread.

These and other objects of the invention are attained by providing a threaded fastener with a plurality of projections extending axially of the fastener toward the leading end thereof, i.e., that end that makes first contact with a mating threaded piece when the fastener is torqued onto the mating piece. The projections vary in size with those nearer the leading end of the fastener being smaller than the adjacent projection nearer the other end of the fastener. Accordingly, the smaller projections make contact with the mating thread prior to the larger projections, thus assuring an interference fit at each projection.

The projections may be formed with two straight-line portions extending at an angle to the normal helix angle. The slope of the first straight-line portion is less than the slope of the second straight-line portion and the first straight-line portion is oriented to making leading engagement with the mating threads when the fastener is tightened. Thus, the on-torque is reduced.

The projections may be generally V-shaped and may be formed with a generally arcuate segment at the apex of the V. Thus, excessive wear on the mating thread is prevented.

For a better understanding of the invention, reference may be made to the following description of an exemplary embodiment, taken in conjunction with the figures of the accompanying drawings, in which.

Figure 1:
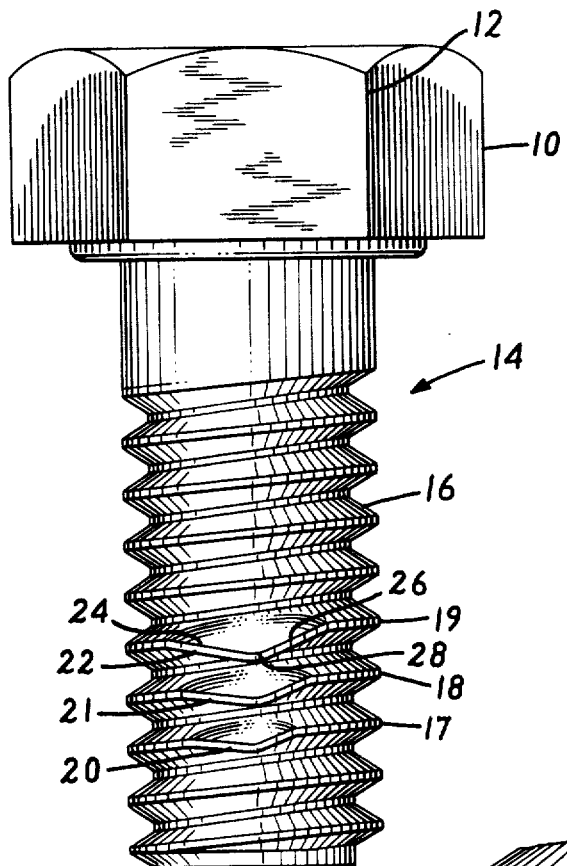
FIG. 1 is a plan view of a male fastener in accordance with this invention.

Referring to FIG. 1, there is disclosed a male fastener including a head portion 10 having a wrenching configuration 12 formed thereon. Projecting downwardly from the head is a shank portion 14 having a threaded section 16. A plurality of thread convolutions 17, 18 and 19 are formed with projections 20, 21, and 22, respectively, extending axially of the shank and toward the point end thereof. It should be understood that the number and location of the projections are by way of illustration only and that their location and number can be varied in accordance with design requirements. For example, although only one projection is shown per convolution, a plurality of such projections could be located on each convolution. Moreover, the projections need not be axially aligned but could be located at varying locations around the circumference of each convolution. It should also be understood that the projections need not be located on adjacent convolutions, but could be spaced apart by one or two convolutions.

Figure 2:
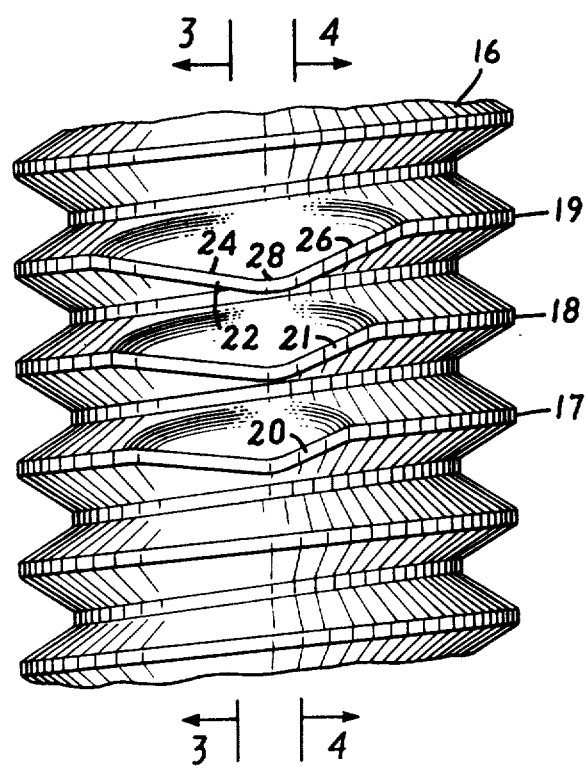
FIG. 2 is an enlarged plan view of the threads of the fastener shown in FIG. 1.

Referring particularly to FIG. 2, it can be seen that the projection 20, closest to the leading or point end of the shank, is smaller in axial displacement and in arcuate length than the adjacent projection 21 and, similarly, projection 21 is smaller in both axial displacement and arcuate length than projection 22. In other words, the size of the projections vary with the smaller projections being located closer to the point of the shank and the size of the projections increasing with distance from the point end of the shank. It should be understood that if the fastener is an internally threaded nut, the smallest distortion would also be located at the leading end, i.e., the end of the nut that engages the bolt first. By this arrangement, all of the projections have an interference fit with a mating thread since the projections do not follow the path caused by the previous projection, but due to their increased size create a new interference fit with the mating thread.

It should be noted that the size of the projections need not increase with distance from the point end of the shank in both axial displacement and arcuate length. Obviously if only the size of the axial displacement increases, a new interference fit will be provided when each projection engages the mating thread. If only the arcuate length of the projections increase, the included angle between the sides of each projection will increase and a new interference fit will be provided when the sides of the larger projections engage the mating thread.

Figure 3:
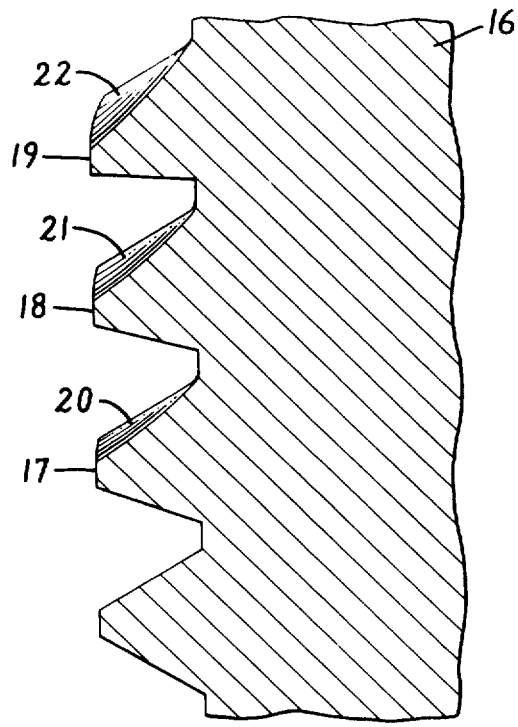
FIG. 3 is a view-in section taken along the line 3—3 of FIG. 2 and looking generally in the direction of the arrows.
Figure 4:
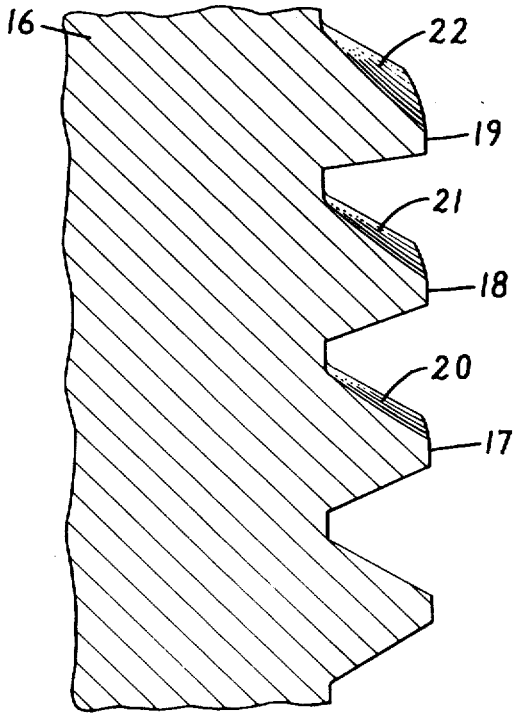
FIG. 4 is a sectional view taken along line 4—4 of FIG. 2 looking generally in the direction of the arrows; and, FIG. 5 is a sectional view of the fastener shown in FIG. 1 in threaded engagement with a mating piece and showing the interference fit therebetween.

The projections 20, 21 and 22 can comprise either distortions of thread or pads of material added to the flank of the thread. In the preferred embodiment disclosed herein, however, the projections comprise distortions of the thread and are generally V-shaped when viewed along a line normal to the longitudinal axis of the shank. As most clearly seen in FIGS. 3 and 4, the projections extend from the inner periphery or root of the thread convolution to the outer periphery or crest thereof to assure that a friction force is developed throughout the full width of the thread.

Since the projections are generally the same, only one will be particularly described herein. Projection 22 comprises a first straight-line segment 24 joined to a second straight-line segment 26 by an arcuate segment 28. Straight-line segment 24 extends downwardly from the undistorted end of convolution 19 at an angle to the normal helix angle. Similarly, straight-line segment 26 extends downwardly from the other undistorted end of convolution 19 at a second angle to the normal helix angle. The second angle is greater than the first angle so that first straight-line segment 24 has a smaller slope than second straight line segment 26. In addition, first straight-line segment 24 is located on the leading edge of the undistorted end of convolution 19 so that as the fastener is torqued into a mating piece, first straight-line segment 24 contacts the mating threads before second straight-line segment 26. Because of the reduced slope of the first straight line segment and its leading location on the thread, the torque required to tighten the fastener to a mating piece is significantly reduced over conventional prevailing torque fasteners.

Arcuate portion 28 does not come to a point, but has a substantial arc length along the thread 19. Thus, a point contact is avoided, the locking load is distributed over a larger area and excessive wear on the mating thread is avoided.

Figure 5:
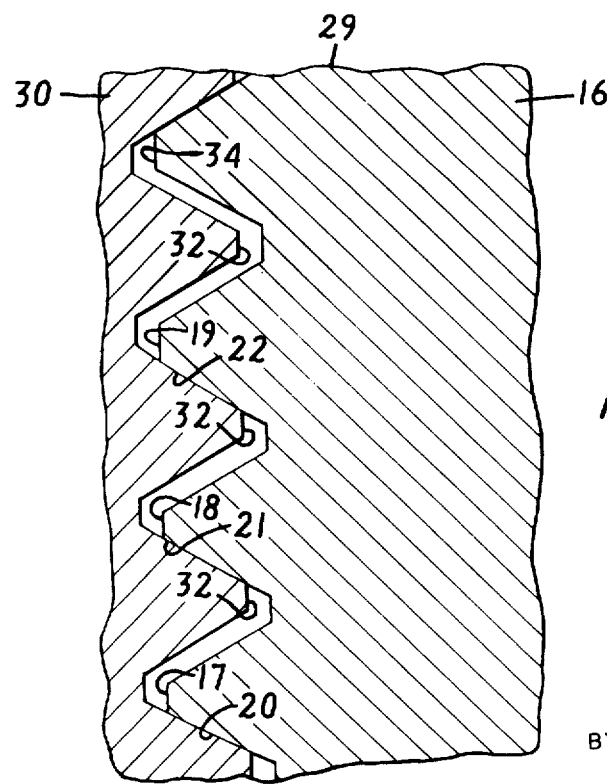

Referring to FIG. 5, a bolt 29 in accordance with this invention is shown in threaded engagement with a nut 30 having a threaded portion 32. When the bolt is torqued into position in the mating member, projections 20, 21 and 22 on threads 17, 18 and 19, respectively, provide an interference fit with threads 32 of the nut 30. As clearly illustrated, the projections are distorted and sprung downwardly. These distortions are the result of an interference fit between the projections and the mating thread and establish a friction force that resists rotation of the bolt relative to the nut. Due to the increasing size of the projections from the point to the head end of the bolt, an interference fit is established by each projection. As clearly seen in FIG. 5, the increased size of the projections from the point to the head end of the bolt causes a corresponding increase in the size of the distortions. An undistorted thread convolution 34 is illustrated and is in normal engagement with thread 32 on the mating piece.

What is claimed is:

1. A prevailing torque fastener comprising a wrench engaging portion and a threaded portion having a leading end and a plurality of thread convolutions generally following the helix of said threaded portion, at least two of said thread convolutions having a generally V-shaped projection extending axially of said threaded portion with the apex of each V directed toward said leading end of said threaded portion and formed by two generally straight-line segments, each of said segments extending at an angle to said helix and from sections of said thread convolutions which follow said helix, said projections progressively increasing in size as their distance from said leading end of said threaded portion increases.

2. A prevailing torque fastener according to claim 1 wherein said projections extend further axially along said threaded portion as their distance from said leading end of said threaded portion increases.

3. A prevailing torque fastener according to claim 1 wherein said generally V-shaped projections include an arcuate segment of substantial length at the apex of the V.

4. A prevailing torque fastener according to claim 1 wherein each of said projections includes a first generally straight line segment extending at an angle from a first point on said thread convolutions and a second generally straight line segment extending at an angle from a second point on said thread convolutions toward said first generally straight line segment, said first point being closer to said leading end of said threaded portion than said second point, and the slope of said first generally straight line segment being less than the slope of said second generally straight line segment.

5. A prevailing torque fastener according to claim 1 wherein said projections extend from the root of said convolutions to the crest of said convolutions.

6. A prevailing torque fastener comprising a wrenching configuration and a threaded portion having a leading end which engages a mating threaded fastener before the remainder of said threaded portion engages said mating fastener, said threaded portion further having a plurality of thread convolutions generally following the helix of said threaded portion and a plurality of generally V-shaped projections spaced along the threaded portion at different distances from said leading end and with the apex of each V extending in an axial direction toward said leading end of said threaded portion, said projections being of different sizes which progressively increase as their distance from said leading end of said threaded portion increases, each of said projections formed by two generally straight-line segments, each of said segments extending at an angle to said helix and from sections of said thread convolutions which follow said helix.

7. A prevailing torque fastener according to claim 6 wherein the threaded portion comprises a shank and the wrenching configuration is formed on a head member, said projections extending further axially along said threaded portion in accordance with the distance from the point end of said shank.

8. A prevailing torque fastener according to claim 6 wherein said generally V-shaped projections include an arcuate segment of substantial length at the apex of said V.

9. A prevailing torque fastener according to claim 6 wherein each of said projections includes a first generally straight-line segment extending at an angle from a first point on said thread convolutions and a second generally straight-line segment extending at an angle from a second point on said thread convolutions, the slope of said first straight-line segment being less than the slope of said second straight-line segment.

10. A prevailing torque according to claim 9 wherein said first point is closer to said point end of said shank than said second point.

11. A prevailing torque fastener according to claim 6 wherein said projections extend from the root of said convolutions to the crest of said convolutions.

* * * * *